(12) United States Patent
Kashi

(10) Patent No.: US 8,176,159 B2
(45) Date of Patent: May 8, 2012

(54) HABIT-BASED AUTHENTICATION

(75) Inventor: Ramanujan Kashi, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 863 days.

(21) Appl. No.: 11/839,935

(22) Filed: Aug. 16, 2007

(65) Prior Publication Data

US 2009/0049544 A1 Feb. 19, 2009

(51) Int. Cl.
*G06F 15/173* (2006.01)
(52) U.S. Cl. ......... 709/223; 709/203; 709/217; 709/224
(58) Field of Classification Search .................. 709/223, 709/224, 217, 219, 203; 713/161, 182, 183, 713/186
See application file for complete search history.

(56) References Cited

U.S. PATENT DOCUMENTS

| | | | |
|---|---|---|---|
| 6,317,992 B1* | 11/2001 | Lin | 33/203.14 |
| 6,334,121 B1* | 12/2001 | Primeaux et al. | 706/62 |
| 6,542,729 B1* | 4/2003 | Chmaytelli et al. | 455/410 |
| 6,609,198 B1* | 8/2003 | Wood et al. | 713/155 |
| 2002/0174426 A1* | 11/2002 | Gutta et al. | 725/30 |
| 2003/0028871 A1* | 2/2003 | Wang et al. | 725/9 |
| 2005/0166065 A1* | 7/2005 | Eytchison et al. | 713/189 |
| 2006/0155847 A1* | 7/2006 | Brown et al. | 709/224 |
| 2006/0223495 A1* | 10/2006 | Cassett et al. | 455/405 |
| 2006/0224898 A1* | 10/2006 | Ahmed | 713/186 |
| 2007/0206741 A1* | 9/2007 | Tiliks et al. | 379/106.02 |
| 2008/0033637 A1* | 2/2008 | Kuhlman et al. | 701/202 |
| 2008/0036591 A1* | 2/2008 | Ray | 340/540 |
| 2008/0220854 A1* | 9/2008 | Midgley et al. | 463/25 |
| 2008/0222038 A1* | 9/2008 | Eden et al. | 705/44 |
| 2009/0113039 A1* | 4/2009 | Savoor et al. | 709/224 |

OTHER PUBLICATIONS

Isohara, Takamasa, Personal Identification . . . Phone, Pub. Date: Jan. 1, 2006.*
Rao Abhijit, "Inception of relation-based . . . analysis", Pub. Date: Jun. 24, 2002.*
Steven White, World IP Organization Application: 2002/060659, Filed Apr. 5, 2007.*
Nexrealm Technologies, "CLAM behavioural . . . users", Published in 2003.*
Hitachi Ltd., "Personal Authentication System . . . ", Filing Date: Jul. 13, 2000.*
Maeda Takushi, Patent No. JP2006065572, Filing Date: Aug. 26, 2004.*
Hou Jianci, China Patent App. No. CN1517889, Filing Date: Jan. 14, 2003.*
M.J. Carey, "Inferring identity from user behaviour", Pub. Date: Dec. 2003.*
Jonas Johansson, World IP Organization Application: 2008/041915, Filed Oct. 4, 2007.*

* cited by examiner

*Primary Examiner* — Lashonda Jacobs

(57) ABSTRACT

A method for authentication is disclosed. During use, the observed usage of the device is compared to an expected pattern of usage of the device. Deviation between the observed and expected usage indicates that the user might not be authorized to use the device. If the deviation exceeds a threshold, a credential is required from the user to authenticate itself as the authorized user.

10 Claims, 5 Drawing Sheets

HABIT-BASED AUTHENTICATION

FIELD OF THE INVENTION

The present invention relates to cryptology in general, and, more particularly, to authentication.

BACKGROUND OF THE INVENTION

The transmission of a secret message implicates two distinct issues or processes: (1) authentication and (2) encryption.

Authentication pertains to proving the origin or source of a message. The goal of this process is to provide assurance, for example, that the message originated from a particular trusted source, or that the user of a restricted-use device is an authorized user. Encryption seeks to hide the information content of a message so that even if an unintended recipient acquires the message, the information it contains will remain unknown.

This disclosure pertains to the authentication process; that is, how to decide if an entity is who it claims to be. This issue has existed for thousands of years and is not likely to disappear soon. This issue, if anything, has assumed increased significance in recent years with the proliferation of wireless telecommunications and portable electronic devices.

Consider, for example, the harm that can result when a computer is lost or stolen. Access is provided to sensitive information of the device owner, such as credit card numbers, phone numbers and addresses, potentially exposing the owner to identity theft. Business competitors might obtain information from the computer that gives them a competitive advantage. If information contained on the stolen computer pertains to a third-party, such as the patient of a medical professional, or the client of an attorney or a financial representative, the third party's medical, legal, or financial information is at risk. In addition to damaging the third party, this could subject the professional who lost the computer to penalties or censure, not to mention a loss of client goodwill and undermined client confidence.

The authentication problem is typically addressed via one of two well-known approaches: (1) authentication based on the possession of certain "knowledge" or (2) authentication based on human physical characteristics or "biometrics."

Knowledge-based authentication relies on the possession of a password. Although the prototypical "Open Sesame" has given way to the now ubiquitous "PIN" or multi-digit personal identification number, the concept remains the same. The primary advantage of using passwords for authentication is that it simplifies the processing systems required for the authentication process and reduces the manufacturing costs of a protected device or system.

The main disadvantage of using a password is that the user of a password must be security conscious. For example, users who are not accustomed to using a password tend to choose easy-to-remember strings of characters or digits as passwords, such as a family member's name or birth date, a home telephone number, a pet's name, etc. These can be readily deduced by one so inclined with only a modicum of resourcefulness. Furthermore, passwords can easily be stolen, such as when they are "shoulder surfed" by someone watching from a nearby location as a user enters their password into a key pad.

The biometric-based authentication process utilizes characteristics of the human body that are unique to a user. The earliest form of biometric-based authentication, which is still used regularly, is based on physical appearance. "That person looks like John; therefore, that person must be John." Most of us have shown a "photo id" to an agent to gain access to plane, to take an exam, or the like.

It has proven to be quite challenging, however, to implement a computerized facial-pattern-recognition system, as is required when a human interrogator is not present during the authentication process. As a consequence, biometric-authentication devices that qualify a candidate based on characteristics that are more amenable to electronic evaluation have been developed. Examples of biometric characteristics that are now being used for authentication include fingerprints, voice characteristics, iris patterns, retina patterns, blood-vessel patterns, hand shapes, and signature dynamics.

Biometric-based authentication avoids some of the problems endemic to password-based authentication. In particular, it avoids the necessity of memorizing passwords and it cannot be surmised by third parties. Furthermore, biometric information is difficult to counterfeit. That is, even if a user is watched as he is undergoing biometric verification, it is exceedingly difficult to fake qualifying biometric information.

For these reasons, biometric authentication is highly reliable. Unfortunately, specialized equipment (e.g., fingerprint scanners, retinal scanners, etc.) is required to read the user's biological characteristics. This adds size, complexity, and cost to device that incorporates biometric authentication.

As a consequence, a different approach to authentication that provides the reliability of biometrics, but at the lower cost of a knowledge-based approach, would be of great benefit to many industries and users.

SUMMARY OF THE INVENTION

The present invention provides a method for authentication that avoids some of the costs and disadvantages of the prior art.

In accordance with the illustrative embodiment, an expected pattern of usage of a device is defined for an authorized user. In some embodiments, the pattern of usage is established based on the authorized user's historical use of the device. "Use" refers, for example, to the actions that the authorized user takes with respect to the device (e.g., which Web sites are visited, which programs are accessed, what phone numbers are called, where the device is taken, when and under what circumstances the device is used, etc.). The pattern of usage is typically established on first use of the device over a defined interval (e.g., a period of time, a number of actions taken with respect to the device, etc.). Assuming that the authorized user's on-going usage of the device is consistent with the pattern of usage that is initially established, that pattern of usage becomes a satisfactory predictor of future use. Hence, this usage pattern serves as an expected pattern of usage of the device.

Normal and continued use of the device might trigger a requirement for the user of the device to authenticate itself to the device. This occurs when the observed usage of the device deviates, beyond a pre-established threshold, from the expected pattern of usage. A deviation beyond the threshold indicates that the current user might not be the authorized user.

When the requirement for authentication is triggered, the user must provide a credential to the device. The user-supplied credential is compared to a reference credential that was previously supplied to the device by the authorized user. If the user-supplied credential and the reference credential match, then continued use of the device is permitted. If there is a discrepancy between the two credentials, then the device is at least partially disabled, limiting or preventing further presumably unauthorized use.

A method for authentication in accordance with the illustrative embodiment of the invention comprises:

comparing observed usage of a device to an expected pattern of usage of the device;

determining whether any differences between the observed usage and the expected pattern of usage exceed a threshold;

requiring a form of authorization for continued usage of the device if the difference exceeds the threshold; and disabling the device if authorization for continued usage is not received.

DETAILED DESCRIPTION

Authentication methods that are described in this disclosure can be used in conjunction with a variety of electronic devices. For example, and without limitation, the disclosed methods can be used in conjunction with electronic devices that:

(a) are enabled for wireless telecommunications (e.g., a cell phone, etc.); or (b) are used for computing (e.g., desktop computers, etc.); or (c) are portable (e.g., laptop computers, etc.); or (d) include any one or more of the capabilities mentioned in items (a) through (c) above (e.g., a "BlackBerry," an Apple "iPhone," etc.).

Figure 1:
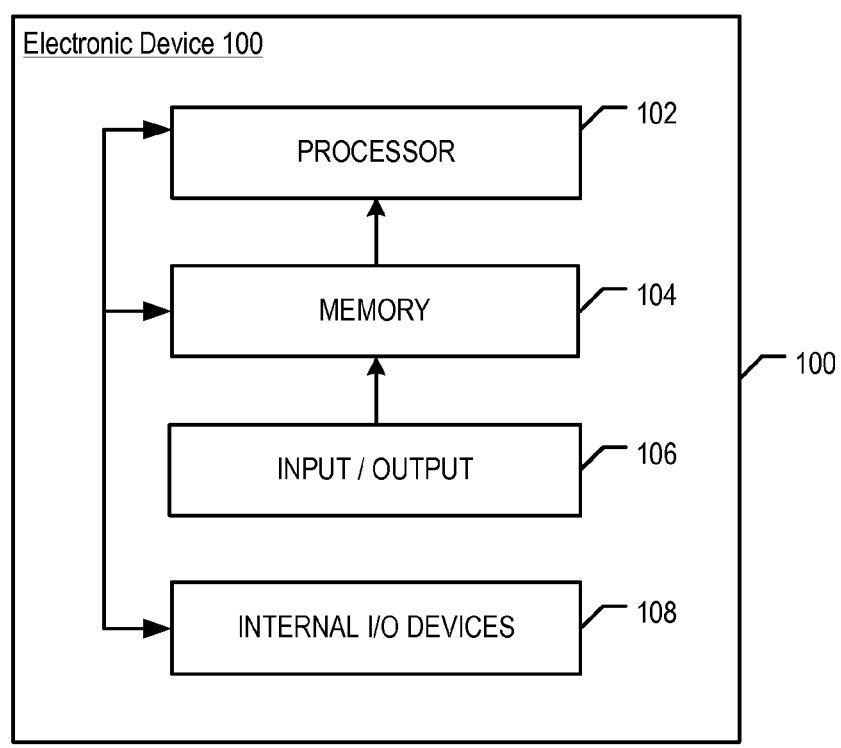
FIG. 1 depicts a block diagram of electronic device 100 in accordance with the illustrative embodiment of the present invention.

FIG. 1 depicts electronic device 100 in accordance with the illustrative embodiment of the present invention. Device 100 includes processor 102, memory 104, input/output 106, and internal input/output devices 108, interrelated as shown.

Processor 102 is a general-purpose processor that is capable of enabling the functionality for which device 100 is designed. That is, processor 102 is capable of performing operations and controlling circuitry that enable device 100 to operate as intended (e.g., as a cell phone, as a laptop computer, etc.). Furthermore, processor 102 is capable of reading data from and writing data to memory 104. Particularly germane to this disclosure is the further capability of processor 102 to execute the tasks described below and with respect to FIGS. 2 through 5. In some alternative embodiments of the present invention, processor 102 is a special-purpose processor. It will be clear to those skilled in the art, after reading this disclosure, how to make and use processor 102.

Memory 104 is a non-volatile random-access memory that stores the instructions and data used by processor 102. It will be clear to those skilled in the art, after reading this disclosure, how to make and use memory 104.

Input/Output 106 are devices/circuitry by which a user provides input to or receives output from device 100. Depending upon the particular configuration of device 100, input/output 106 includes one or more of the following elements, in addition to any others:

1. A keypad or keyboard for receiving character and user-selection input from a user of device 100.
2. A microphone for receiving an acoustic signal, such as the speech of the user, and for converting the acoustic signal to an electrical signal.
3. A display screen, such as a liquid crystal display, for delivering output information (e.g., text, images, video, etc.) to a user of portable terminal 100.
4. A speaker for outputting an acoustic signal, such as the speech of another person, a ring tone, etc., to a user of device 100.

These devices and circuitry are well known and it will be clear to those skilled in the art how to make and use various input/output devices 106.

Internal I/O devices 108 are devices and circuitry that provide information to or receive information from processor 102. Depending upon the particular configuration of device 100, internal I/O devices 108 includes one or more of the following elements, in addition to any others:

1. A GPS receiver for position determination;
2. A clock for measuring time;
3. A transmitter for transmitting calls;
4. A receiver for receiving calls;
5. One or more sensors (e.g., motion, gravity, light, temperature, etc.) for sensing an environmental characteristic, orientation, etc.

Figure 2:
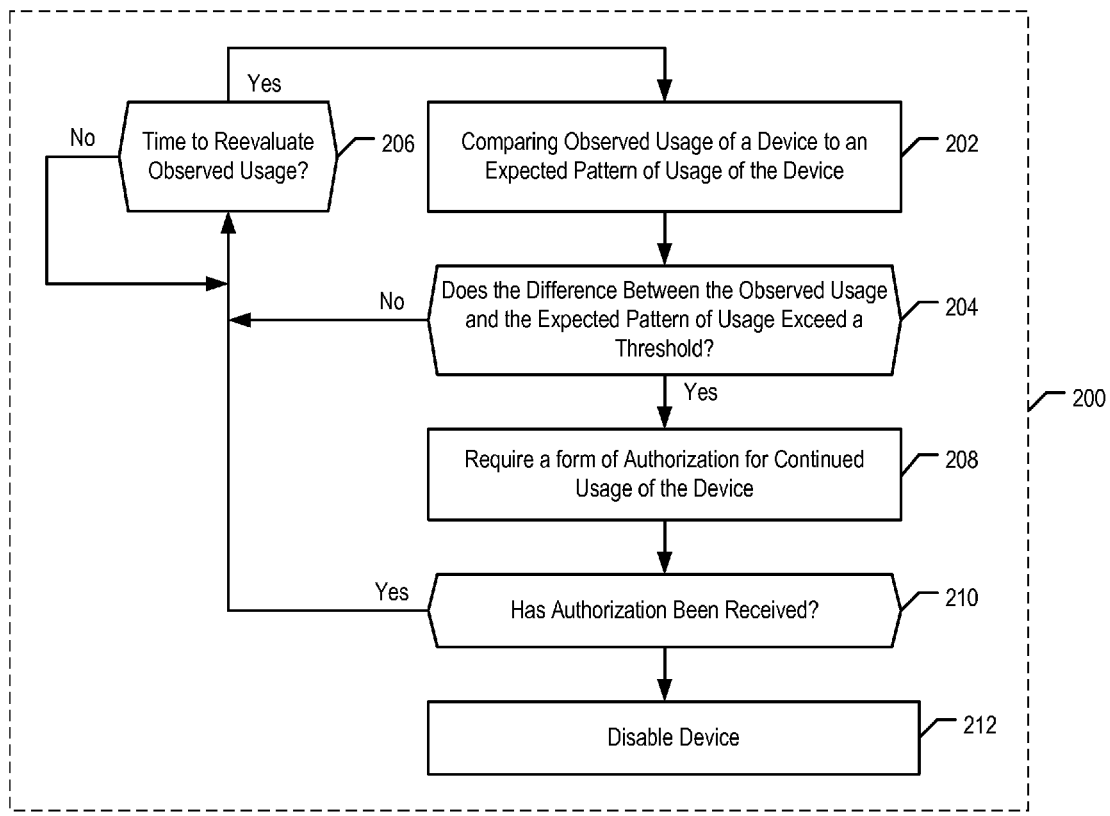
FIG. 2 depicts method 200 for authentication in accordance with the illustrative embodiment of the invention.

FIG. 2 depicts method 200 for authentication in accordance with the illustrative embodiment of the present invention. Method 200 can be used, for example, to ensure that commands that are received by device 100 are originating from an entity that is authorized to use it. Method 200 comprises the following tasks:

202—Comparing observed usage of a device to an expected pattern of usage of the device.

204—Querying if the difference between the observed usage and the expected pattern of usage exceeds a threshold.

206—Querying if it is time to reevaluate the observed usage.

208—Requiring a form of authorization for continued usage of the device if the difference exceeds the threshold.

210—Querying if authorization has been received if it is required.

212—Disabling the device if authorization is required but not received.

Figure 3:
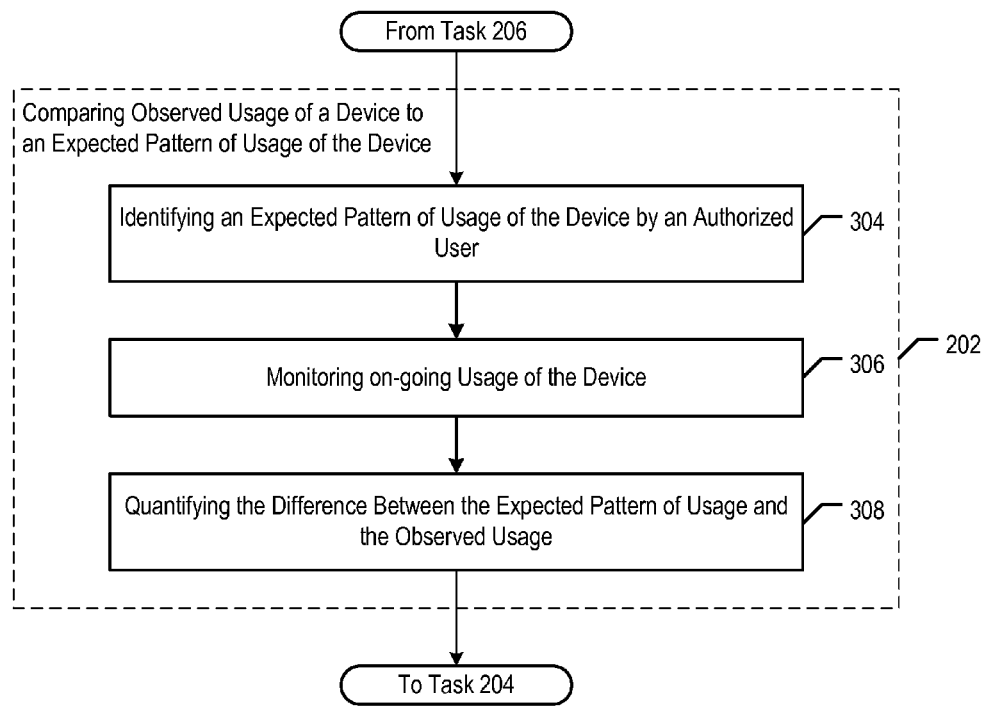
FIG. 3 depicts a method for performing task 202 of method 200.

Tasks 202 through 212 of method 200 are briefly described below and then, as appropriate, further explanation of some of these tasks is provided in conjunction with FIGS. 3 through 5.

In accordance with task 202 of method 200, the observed usage of device 100 is compared to an expected pattern of usage of that device.

The phrase "pattern of usage" is defined for use in this disclosure and the appended claims as a characteristic manner or habitual way in which a user uses device 100. This habitual use can be, for example, certain routine actions that the user takes with respect to the device (e.g., accessing certain software applications, visiting certain Web sites, calling certain phone numbers, etc.) as well as some "measure" of those actions (e.g., the order in which actions are performed, the duration of the actions, the time that the actions are performed, etc.). The expected pattern of usage is the characteristic manner or habitual way in which an authorized user (e.g., the owner of device 100) is expected to use the device. In some embodiments, the expected pattern of usage is based on the authorized user's historical pattern(s) of usage. The concepts of "pattern of usage' and "expected pattern of usage" will be described in further detail later in this specification.

The phrase "observed usage" is used in this disclosure and the appended claims to refer to the manner in which device 100 is being used at any given time or period of time by a user, whether authorized or unauthorized. Task 202 is described in further detail later in this specification with respect to FIGS. 3 and 4.

As will become clearer later in this specification, if the current user of the device (upon whose usage the "observed usage" is based) is the authorized user, the observed usage should correspond reasonably well to the "expected pattern of usage." Of course, there will be some variability or differences in the usage pattern of an authorized user. But as the differences increase beyond a threshold, the likelihood increases that the current user is not the user on which the expected pattern of usage is based. In other words, a difference that exceeds the threshold indicates that the current user might not be the authorized user. Query, at task 204, whether the difference between the expected pattern of usage and the observed usage exceeds the threshold.

If the difference between the observed usage and the expected pattern of usage does not exceed the threshold, authorization for continued use is not required. Processing then continues at task 206 by querying whether it is time to re-evaluate the observed usage of the device.

Regarding task 206, the "observed usage" is not necessarily based on the continuous usage of device 100 by the user. That is, although all actions of a user might be stored in memory, the actions that are evaluated for characterizing the observed usage might include only those that occur with a specific time period (e.g., 8:00 am to 11:00 am, daily). Or the actions might be monitored, for a period of time (e.g., three hours, etc.) beginning after a certain period of inactivity (e.g., eight hours, etc.) of device 100. In some embodiments, the monitoring depends, to at least some extent, upon the nature of the expected pattern of usage. As used in this disclosure and the appended claims, the terms "monitored" and "monitoring" mean "tracked or otherwise stored in memory and used to evaluate device usage (either the 'observed usage' or the 'pattern of usage'). Further detail concerning the time for monitoring is provided later in this specification.

If, however, the difference between the observed usage and the expected pattern of usage exceeds the threshold, a form of authorization is required from the current user, as per task 208.

If authorization is received, as established at task 210, then the user can continue to use device 100. If, however, authorization is not received, then device 100 is disabled at task 212. In some embodiments, device 100 is partially disabled, wherein it continues to perform only a limited set of tasks (e.g., place a 9-1-1 call, contact the provider of wireless service, etc.). In some other embodiments, device 100 is completely disabled, so that device 100 must be returned to an authorized facility for reactivation. Further detail concerning authorization, as per tasks 208/210, is provided later in this specification in conjunction with FIG. 5.

Further disclosure pertaining to the concepts of a "pattern of usage" and an "expected pattern of usage" is now provided. It will be recalled that task 202 of method 200 requires "comparing observed usage of the device to an expected pattern of usage of the device." In accordance with the illustrative embodiment, which is depicted in FIG. 3, this task is implemented via three sub-tasks 304 through 308:

304—"identifying an expected pattern of usage of the device by an authorized user;"
306—"monitoring on-going usage of the device;" and
308—"quantifying the difference between the expected pattern of usage and the observed usage."

Sub-task 304 requires identifying an expected pattern of usage of the device by an authorized user. The phrase "pattern of usage" was previously defined as a habitual or characteristic way in which a user uses device 100.

In some embodiments, the pattern of usage is defined based on a user's historical usage of the device for a defined period of time. If that user's interactions with device 100 are consistent over time, the pattern of usage will be a reasonably accurate predictor of the manner in which device 100 will be used in the future.

If, therefore, the pattern of usage is developed based on the actions of an authorized user of device 100, that pattern of usage will reasonably predict the manner in which device 100 will be used by the authorized user at any time in the future. This predicted behavior by the authorized user is the "expected pattern of usage."

Figure 4:
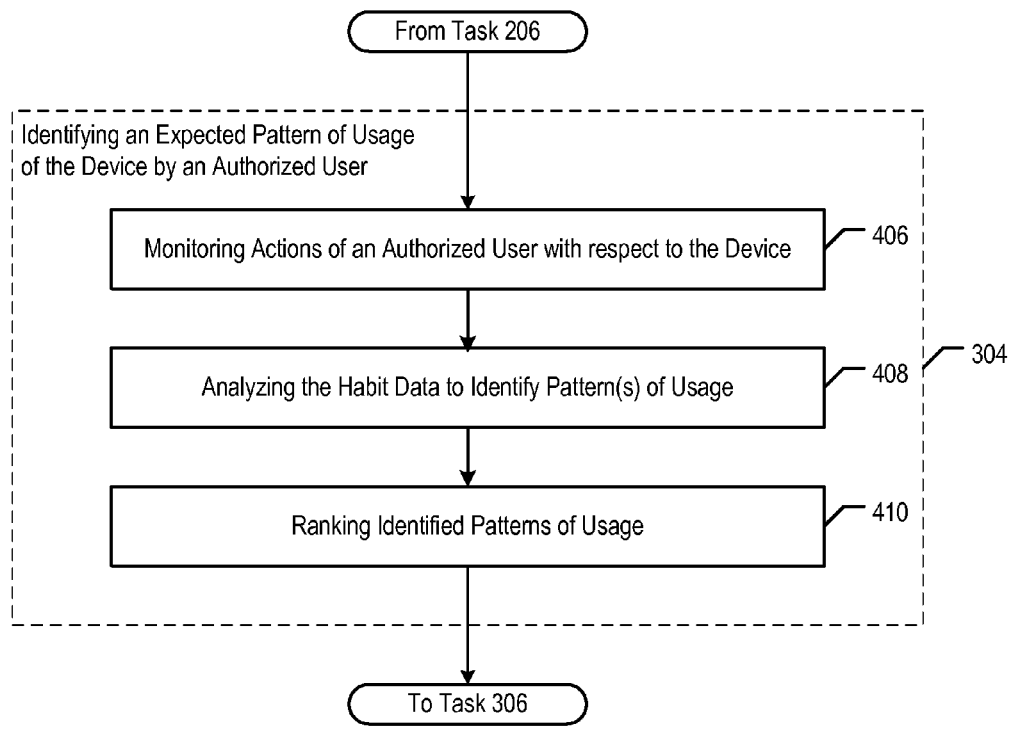
FIG. 4 depicts a method for performing subtask 304 of task 202.
Figure 5:
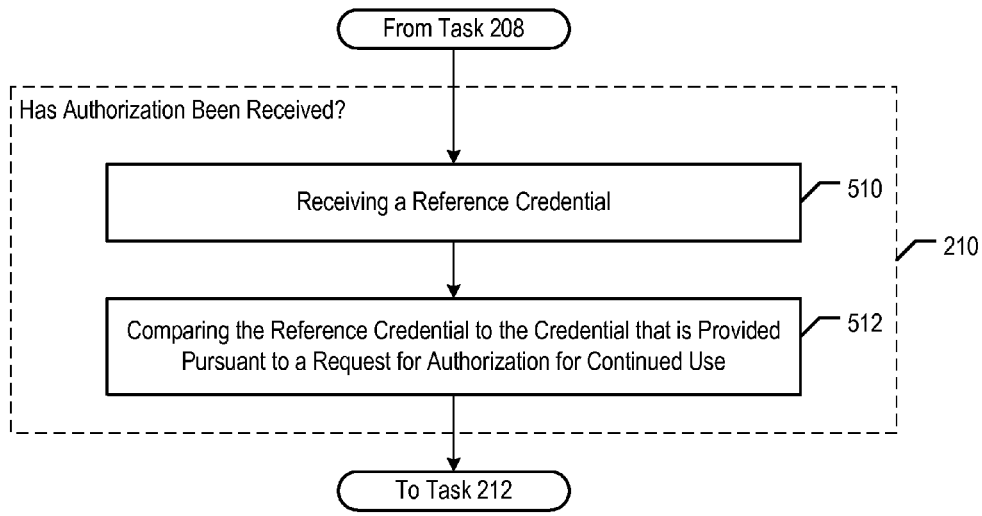
FIG. 5 depicts a method for performing task 210 of method 200.

The expected pattern of usage is identified or characterized in accordance with the subtasks 406 through 410, as depicted in FIG. 4:

406—"monitoring actions of an authorized user with respect to the device as a function of one or more measurement parameters;"
408—"analyzing the habit data to identify pattern(s) of usage;" and
410—"ranking identified patterns of usage."

In accordance with the subtask 406, the "pattern of usage" is developed by monitoring any one or more of a variety of different "actions" taken by the authorized user with respect to device 100, as evaluated in the context of one or more of a variety of different "measures" (i.e., how to correlate the actions). These "actions" and "measures" are collectively referred to as "habit data."

"Actions" that are monitored to identify a pattern of usage may include, without limitation:
  A1. Placing a call;
  A2. Checking an internet Web site;
  A3. Checking an electronic calendar;
  A4. Checking an electronic "To-Do" list;
  A5. Checking e-mail;
  A6. Sending an e-mail;
  A7. Using a specific program (e.g., Microsoft Word©, Adobe Acrobat©, etc.); or
  A8. A combination of any one or more of actions A1 through A7.

"Measures" that are applied to the actions to identify a pattern of usage may include, without limitation:
  M1. The order in which the actions are performed;
  M2. The time at which actions are performed;
  M3. The location at which actions are performed;
  M4. The type of actions that are performed;
  M5. The duration of actions that are performed;
  M6. The number of actions (or different type of actions) that are performed;
  M7. If the action is a telephone call, the pattern can be based on to whom the call is placed; or
  M8. A combination of any one or more of patterns 1 through 7.

It will be appreciated that a very large number of potential "patterns of usage" arise based on all possible combinations of the habit data. The following list provides just a few examples of patterns of usage that are potentially suitable as a basis for the authentication methods disclosed herein:

(a) A2/A3/A4 and M1. The owner of a portable wireless device might habitually first check an Internet news site (A2), then consult an electronic calendar (A3), then check a "To-Do" list (A4). To the extent that the order in which the user performs these particular actions is consistent, these ordered actions can form a "pattern of usage" that is characteristic of the authorized user's usage of the device. If there is a deviation from this pattern of usage, it could be an indication that the user of the device is not the owner of the device.

(b) A1 and M2. The owner of a cell phone might tend to place phone calls between the hours of 9:30 am and 9:00 pm. If calls are being placed at different hours, such as 12 midnight, this could be an indication that the user of the device is not the owner of the device.

(c) A1 and M5. The owner of a cell phone might routinely limit the duration of phone calls to less than 3 minutes. A thirty-minute call might indicate that someone other than the owner is using the phone.

(d) A1 and M2/M7. The owner of a cell phone might be habitually call a loved one, such as a parent at a certain time every day. If such a call is not made at or near the usual time, even though the device is in use, this could be an indication that the user of the device is not the owner of the device.

(e) A1 and M6/M7. On any given day, the owner of a cell phone might be expected to call some numbers that have been previously called (e.g., a friend's phone number, etc.) and perhaps several other numbers that have never been called. But if more than a certain number of calls in a given period of time are placed to never-before-called numbers (i.e., numbers that are not in a contact list), this could be an indication that the user of the device is not the owner of the device.

(f) A8 and M2/M3 (or M2/M3 alone). It can be expected that the portable electronic device will usually be at the home of the owner of the device when the owner begins their day (e.g., 6:45 am, etc.). To the extent that the device is not at this location at this time, it might not be in the possession of the owner of the device.

(g) A8 and M4/M6. The owner of a portable electronic device might tend to use the device on a relatively infrequent basis during the day to perform only one or two different tasks. Extensive use of the device during a period of time might indicate that someone other than the owner is using the device.

It is expected that there will only be a few combinations of habit data that are characteristic of any given individual's usage of device 100. Only those few combinations are suitable for defining a "pattern of usage" and will be useful for the authentication process disclosed herein.

Combinations of habit data that are suitable for defining an expected pattern of usage for any given device owner will not necessarily be known in advance of the owner's use of device 100. As a consequence, in some embodiments, processor 102 monitors a standard complement of different habit data combinations, in accordance with subtask 406.

The monitoring is accomplished in conjunction with appropriate internal input/output devices 108, which are used, in some embodiments, for providing the "measure" (e.g., a GPS receiver—for position [M3]; a clock—for time [m2], duration [M5]; etc.). Information concerning "measures" and "actions" can be stored in various logs that are established in memory 104 (e.g., a call log for outbound calls [A1]/[M2], [M5], [M7]; an action log for tracking the type of actions that are taken and their order, duration, etc. [M4], [M1], [M5], etc.). Those skilled in the art will know how to make and use internal input/output devices 108 and how to create various logs in memory 104.

In some alternative embodiments, an authorized user of device 100 specifies which particular "action" or "actions" should be monitored, with or without specifying the particular "measure." For example, an authorized user could direct device 100 to observe which internet sites are visited over the course of a week, without specifying the measure for correlation (e.g., the order in which sites are visited, the time of day that they are visited, etc.). In some embodiments, a menu of specific action(s) can be selected for monitoring. Processor 100 will track the action, as a function of a variety of different measures, or based on a measure(s) provided by the user.

In some embodiments, the monitoring activities for developing the expected pattern of usage begin on first use of device 100. The monitoring operation continues until some type of metric is satisfied. For example and without limitation, monitoring continues until:

(1) a prescribed number of "actions" have been performed (e.g., monitor the first 250 actions, etc.); or
(2) a prescribed period of time has elapsed (e.g., 10 days, etc.), or
(3) the monitoring period is ended by the authorized user (upon entry of an appropriate command).

In accordance with sub-task 408, the habit data is analyzed to identify patterns of usage. Analyses are performed by processor 102 using an appropriate algorithm(s) and statistical methods.

In sub-task 410, the patterns of usage are ranked. In some embodiments, the highest-ranked pattern of usage is the pattern that exhibits the best correlation between an action and measure for the authorized user's use of device 100 for the monitoring period.

In some cases, more than one pattern of usage, each of which patterns rely on different actions and/or measures, will be identified in sub-task 408. To the extent that this occurs, these patterns can be combined in various ways to effectively tighten or relax the scrutiny that is paid to a user's actions vis-à-vis the expected pattern of use. For example, assume that two patterns of usage are identified. In a first case, the two patterns of usage are "ANDed" together such that the observed usage must pass muster with respect to both patterns (in task 204 of method 200). In a second case, the patterns of usage are "ORed," such that the observed usage can pass muster with respect to either of the patterns of usage. In a third case, one of patterns is selected as the expected pattern of usage, such that the observed usage must pass muster with respect to only that one pattern. The level of scrutiny is highest in the first case, lowest in the second case, and intermediate in the third case. In other words, it will be most difficult to avoid triggering the requirement to authenticate in the first case and least difficult in the second case.

Those skilled in the art, after reading the present disclosure, will be able to develop suitable algorithms for use by processor 102 to analyze the habit data for patterns of usage and to rank the identified patterns in terms of statistical bases, etc.

In some alternative embodiments, the expected pattern of usage is provided to device 100 by the authorized user. For example, the authorized user might know that, on a daily basis, the first action that is taken with respect to the device is to access a certain website. This information can be provided to device 100 and explicitly defined as the expected pattern of usage.

Continuing now with subtask 306 of task 202, the observed usage is characterized by monitoring on-going usage of device 100. As previously described, the monitoring typically occurs for a discrete period of time. Of course, the usage being observed (i.e., the particular actions and measures) must be consistent with the actions/measures that form the basis of the pattern of usage. In other words, if the expected pattern of usage pertains to taking certain actions in a certain order, then the observed usage must focus on that same type of habit data.

Any differences between the observed usage and the expected pattern of usage are quantified or otherwise characterized in subtask 308. The manner in which the differences are expressed will, of course, be a function of the pattern of usage. For example, if the expected pattern of usage relates to the duration of phone calls, then the difference could be expressed, for example, in "minutes per call."

Returning to method 200 of FIG. 2, having "compared observed usage of the device to an expected pattern of usage of the device" (task 202), query whether the difference between the observed usage and the expected pattern of usage exceeds a threshold.

The "threshold," like the "difference" that is determined in subtask 308, is expressed in terms that are relevant to the expected pattern of usage. For example, returning to the example of an expected pattern of usage that relates to the duration of phone calls, the threshold could be "10 minutes per call." If the expected pattern of usage is a phone call having an average duration of 4 minutes and the observed usage shows average call duration of 5.5 minutes, the difference between the observed usage and the expected pattern of usage is +1.5 minutes per call. If the threshold is 10 minutes per call, then the difference does not exceed the threshold.

If, on the other hand, the observed usage indicates that the average call duration is 45 minutes, then the difference is +41 minutes and the threshold is exceeded.

If the threshold is exceeded, then authorization is required for continued use of device 100, as per task 208. Query, at task 210, if authorization has been received. Further detail regarding task 210 and "authorization" is now described with reference to FIG. 5.

In accordance with illustrative embodiment, task 210 is implemented via two subtasks, which include:
  510—"receiving a reference credential;" and
  512—"comparing the reference credential to the credential that is provided pursuant to the request for authorization in task 208.

The reference credential is provided to device 100 by the authorized user, typically upon initial use of the device. The reference credential can be:
  a password (e.g., a string of alphanumeric characters, etc.); or
  an item of trivia (e.g., mother's maiden name, etc.); or
  an action(s) taken with respect to device 100 (e.g., go to a web site and then access a program, etc.); or
  a specific physical characteristic (e.g., a fingerprint, an iris pattern, etc.); or
  any combination of the above credentials.

It will be appreciated that the use of a specific physical characteristic, as read by a scanner, introduces complexity into device 100 that the present invention seeks to avoid. As a consequence, other types of reference credentials, such as the other types listed above, will preferably (but not necessarily) be used instead.

In accordance with subtask 512, the user is prompted to supply a credential to device 100. The user-supplied credential will then be compared to the reference credential. A match between the supplied and reference credentials authenticates the user as an authorized user. If there is a discrepancy between the user-supplied credential and the reference credential, device 100 is at least partially disabled at operation 212. (The user will typically have at least a couple of opportunities to re-present a credential before the device is disabled.) In some embodiments, re-enabling device 100 after it is disabled pursuant to a failed authentication requires contact with a manufacturer or service provider.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
  comparing, at an electronic device, an observed usage, during a first time period, of the electronic device by an entity to an expected pattern of usage of the electronic device, wherein the expected pattern of usage is a user-defined input that relates to an order in which actions are performed, and wherein at least one of the actions are correlated with a geographic location; and
  requiring, at the electronic device, a credential for continued usage, after the first time period, of the electronic device by the entity when a difference between the observed usage of the electronic device and the expected pattern of usage of the electronic device exceeds a threshold.

2. The method of claim 1 wherein the credential is at least one of a password and an item of trivia.

3. The method of claim 1 wherein the expected pattern of usage correlates at least one of the actions with time.

4. The method of claim 1 wherein the expected pattern of usage relates to at least some telephone numbers that are called from the electronic device.

5. The method of claim 1 wherein the electronic device is selected from the group consisting of a wireless terminal and a portable computing device.

6. A method comprising:
  monitoring actions of an authorized user with respect to a device to develop an expected pattern of usage of the device;
  monitoring actions of an entity with respect to the device, during a first time period, thereby defining observed usage of the device during the first time period; and
  comparing, in a processor, the observed usage to the expected pattern of usage, wherein the expected pattern of usage relates to a count of different types of actions performed by the entity; and
  requiring authorization for continued unrestricted operation of the device by the entity, after the first time period, when a difference between the observed usage and the expected pattern of usage exceeds a threshold.

7. The method of claim 5 further comprising deactivating at least some functionality of the device when authorization is required but not provided.

8. The method of claim 5 wherein the task of requiring authorization further comprises requiring a credential that identifies the entity as an authorized user.

9. The method of claim 8 wherein the credential is a password.

10. The method of claim 8 wherein the credential is an item of trivia.

* * * * *